US011180156B2

(12) United States Patent
Lopez et al.

(10) Patent No.: US 11,180,156 B2
(45) Date of Patent: Nov. 23, 2021

(54) FAULT COORDINATION AND MANAGEMENT

(71) Applicant: Zoox, Inc., Foster City, CA (US)

(72) Inventors: Matthew Daniel Lopez, Morgan Hill, CA (US); Collin MacGregor, Foster City, CA (US); Radhika Jitendra Patel, Redwood, CA (US); Derek Redfern, San Francisco, CA (US); Kristofer Sven Smeds, Mountain View (CA)

(73) Assignee: Zoox, Inc., Foster City, CA (US)

( * ) Notice: Subject to any disclaimer, the term of this patent is extended or adjusted under 35 U.S.C. 154(b) by 91 days.

(21) Appl. No.: 16/718,019

(22) Filed: Dec. 17, 2019

(65) Prior Publication Data
US 2021/0179121 A1 Jun. 17, 2021

(51) Int. Cl.
B60W 50/029 (2012.01)
G07C 5/00 (2006.01)
B60W 50/038 (2012.01)
G07C 5/10 (2006.01)

(52) U.S. Cl.
CPC ........ B60W 50/029 (2013.01); B60W 50/038 (2013.01); G07C 5/008 (2013.01); G07C 5/10 (2013.01); B60W 2552/00 (2020.02); B60W 2555/20 (2020.02)

(58) Field of Classification Search
CPC ............. B60W 50/029; B60W 50/038; B60W 2552/00; B60W 2555/20; G07C 5/10; G07C 5/008
USPC .......................................................... 701/2
See application file for complete search history.

(56) References Cited

U.S. PATENT DOCUMENTS

| 9,406,177 | B2 | 8/2016 | Attard et al. | |
| 9,792,656 | B1 | 10/2017 | Konrardy et al. | |
| 10,137,903 | B2* | 11/2018 | Tascione | B60W 50/0225 |
| 10,338,594 | B2* | 7/2019 | Long | G06K 9/00798 |
| 10,424,135 | B2 | 9/2019 | Poeppel et al. | |
| 2008/0074247 | A1* | 3/2008 | Plantamura | B60W 50/14 340/438 |
| 2015/0178998 | A1* | 6/2015 | Attard | G07C 5/008 701/23 |
| 2018/0147721 | A1* | 5/2018 | Griffin | A47L 11/4011 |
| 2018/0164813 | A1* | 6/2018 | Poeppel | G06Q 10/047 |
| 2018/0365908 | A1* | 12/2018 | Liu | G05D 1/0044 |

(Continued)

FOREIGN PATENT DOCUMENTS

GB 2524393 A 9/2015
KR 2014-0127068 * 11/2014

OTHER PUBLICATIONS

The PCT Search Report and Written Opinion dated Mar. 12, 2021 for PCT Application No. PCT/US20/64174, 10 pages.

Primary Examiner — Muhammad Shafi
(74) Attorney, Agent, or Firm — Lee & Hayes, P.C.

(57) ABSTRACT

The described techniques relate to coordinating and managing faults of systems of a vehicle, such as an autonomous vehicle, to enable the vehicle to respond safely and appropriately to the faults. In examples, a centralized fault monitor system receives faults from different vehicle systems, maps the received faults to associated fault constraints, prioritizes different and shared parameters between the fault constraints, and communicates the constraint parameters to appropriate vehicle systems accordingly.

16 Claims, 8 Drawing Sheets

(56) References Cited

U.S. PATENT DOCUMENTS

2019/0220026 A1\* 7/2019 Vawter .................... B60Q 1/50
2021/0179127 A1 6/2021 Lopez et al.

\* cited by examiner

FAULT COORDINATION AND MANAGEMENT

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects, such as to avoid collisions with objects in the surrounding environment. A variety of systems may contribute to assist the autonomous vehicle with navigating the environment. Occasionally, one or more of these systems may experience a fault or error, which may affect how the autonomous vehicle traverses the environment. Determining how the autonomous vehicle will handle a fault or error may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
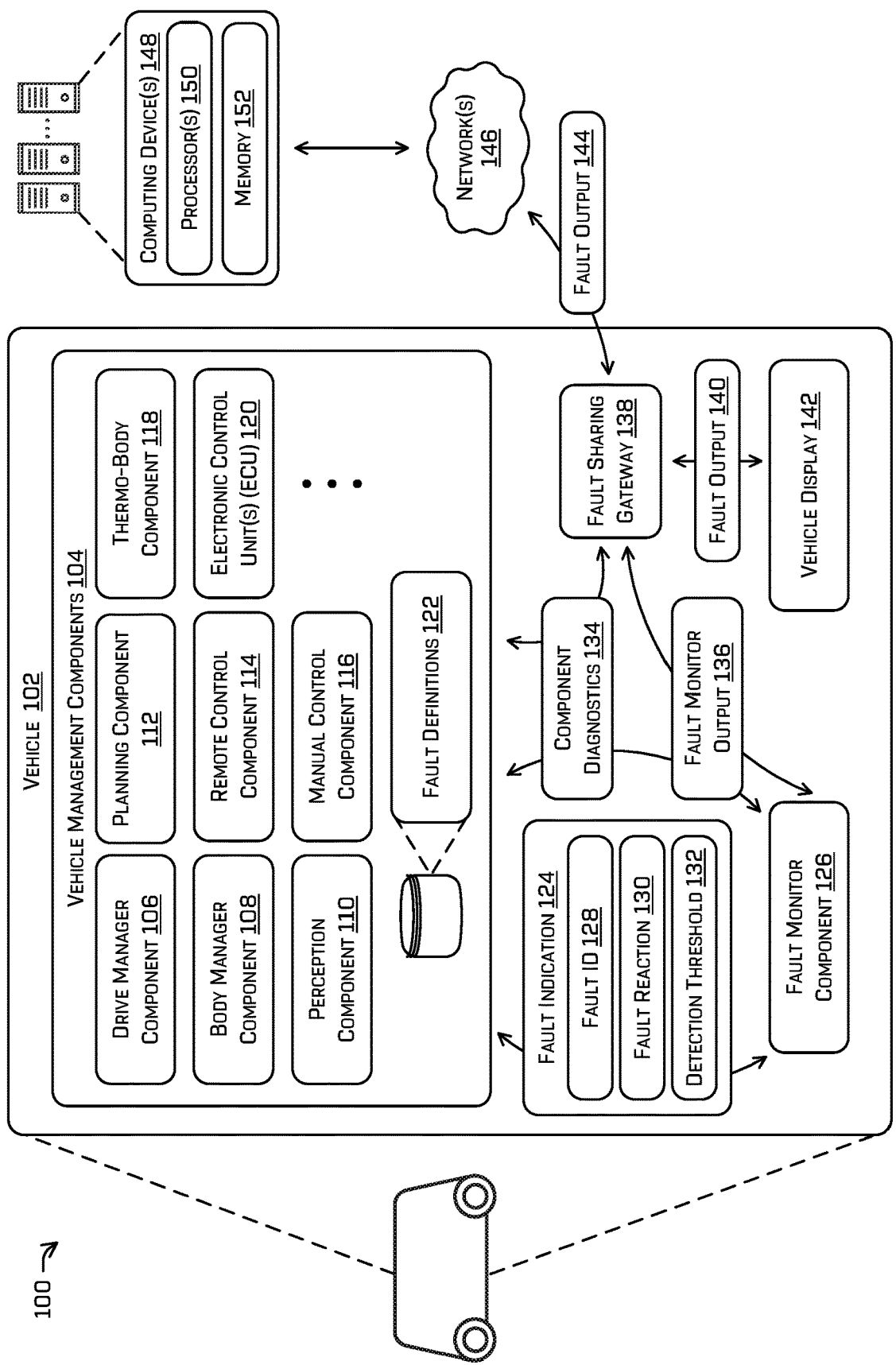
FIG. 1 depicts a block diagram of an example fault management system of a vehicle, in accordance with examples of the disclosure.

This disclosure relates to coordinating and managing faults of systems of a vehicle, such as an autonomous vehicle, to enable the vehicle to respond safely and appropriately to the faults. In examples, a vehicle may include a variety of systems that enable the vehicle to traverse an environment, such as a sensor system, a drive manager system, a body manager system, a planning system, a perception system, a remote control system, a manual control system, a temperature control system, and a number of electronic control units (ECUs), among others. At any point in time, any one of these systems may have one or more faults present. As used herein, a fault may correspond to an error associated with the system (e.g., functionality of the system that is not working properly) and/or a signal associated with such an error. Different faults may have different corresponding constraints that direct the vehicle to proceed in a certain way such that damage to the vehicle is prevented and/or minimized, while ensuring safety for passengers and persons and objects in the surrounding environment. For instance, a non-operational headlight fault may cause the vehicle to be constrained to traveling in a particular orientation, and an overheating fault may cause the vehicle to stop within a predetermined amount of time to allow the vehicle to cool down. The techniques described herein detail how to safely operate a complex system, such as an autonomous vehicle, where multiple faults arise and/or when a remediation to a fault is ineffective. Additional details regarding a fault monitor system may be found in U.S. patent application Ser. No. 16/539,893, which is incorporated by reference herein in its entirety.

In some cases, multiple faults may be duplicative and indicate a larger, otherwise unidentified problem with the vehicle, and/or may conflict with one another. Some conventional systems for fault management would take an overly conservative approach to these scenarios, such as by removing a vehicle from service if multiple and/or conflicting faults were present, regardless of the fault type. On the other hand, some conventional systems allow a vehicle to continue operating as normal despite the presence of faults, which may endanger passengers and surrounding persons and objects, or cause additional damage to the vehicle. Further, conventional systems often do not provide different vehicle systems with ways communicate faults with one another, which may also reduce safety for the vehicle, passengers, and surrounding persons and objects.

Therefore, the described techniques provide a centralized fault monitor system for receiving faults from different vehicle systems, mapping the received faults to associated fault constraints, prioritizing different and shared parameters between the fault constraints, and communicating the constraint parameters to appropriate vehicle systems accordingly. For example, a fault monitor system may receive a fault indication from a vehicle system, where the fault indication is associated with a fault of the vehicle system (or another, different vehicle system). The vehicle system may be a drive manager system, a body manager system, a manual control system, a remote control system, a planning system, a power manager system, a temperature regulation system, and/or an electronic control unit (ECU), to name a few examples, as mentioned above and discussed in more detail below. In some cases, the fault indication may be received from the fault monitor system itself. The fault indication may include information such as an identification of the fault type, a fault reaction (e.g., an instruction for the vehicle to resolve the fault), a detection threshold for the particular fault (e.g., a temperature threshold, a power threshold, a time threshold, etc.), and the like.

In some examples, the fault monitor system may determine a constraint to be applied by the vehicle based on the fault identification included in the fault indication. In some cases, the fault monitor system may map the fault identification to a predetermined constraint associated with the fault. For example, a fault identification that an ECU of the vehicle is overheating may be mapped to a constraint to cause the vehicle to find a safe location to park within a maximum amount of time (e.g., 2 minutes) to allow the temperature of the ECU to decrease. The constraint may include one or more instructions or parameters for the vehicle to take an action to resolve the fault.

In some cases, a constraint may not cause the vehicle to take an action immediately (or within a predetermined time), but instead may provide an output for a maintenance system that includes information relevant for vehicle maintenance. The constraint may cause the reporting vehicle system to take an action, and/or may cause an alternate vehicle system to take an action aimed at resolving the fault. In some examples, one or more vehicle systems may supply the fault monitor system with multiple fault indications that may be mapped to a same constraint. In such cases, the fault monitor system may determine a different (e.g., more restrictive) constraint when a same constraint is duplicated, as duplicated constraints may evidence a larger problem with the vehicle than if the faults and corresponding constraints were considered individually.

In some examples, the fault monitor system may receive multiple fault indications which are mapped to multiple different corresponding constraints having associated instructions for the vehicle to take action(s). In some cases, the fault monitor system may prioritize the multiple instructions for the vehicle in a way that ensures safety of passengers and persons and objects in the surrounding environment while minimizing damage to the vehicle. For instance, the fault monitor system may select the most restrictive instructions from the different constraints, and use the most restrictive constraints to control the action(s) of the vehicle to resolve the faults and ensure safety of passengers and surrounding persons and objects, as described.

In an illustrative example, consider the example above in which the ECU sends a fault indication to the fault monitor system that the ECU was overheating, and the fault monitor system maps the fault indication to the constraint that includes the instruction to find a safe location to park within a maximum amount of time (e.g., 2 minutes). In addition, the fault monitor system may receive a fault indication from a body manager system that a door to the vehicle has become ajar, where the fault monitor system maps this particular fault indication to a constraint that includes an instruction to pull over immediately.

The fault monitor system may compare the instructions included in the two constraints, and determine that the instruction to pull over immediately restricts the action of the vehicle more than the instruction to find a safe place to park within 2 minutes. The fault monitor system may output an instruction to the planning system to cause the vehicle to pull over immediately, based on the more restrictive instruction. The fault monitor system may clear and/or ignore the instruction to pull over within 2 minutes. However, in some cases, the fault monitor system may continue to enforce other instructions included in the constraint associated with the ECU overheating. For example, the constraint associated with the ECU overheating may include an additional instruction that prevents the vehicle from releasing from the stop until the ECU has cooled below a threshold temperature, which may continue to be enforced by the fault monitor system even if the door ajar fault is resolved (e.g., the door is closed). Therefore, the vehicle may execute safer actions that minimize further damage to the vehicle by coordinating faults using the fault monitor system, as opposed to current techniques that do not provide a centralized fault management system.

In some examples, the fault monitor system may, similar to the discussion above, map a first fault indication to a first constraint, and a second fault indication to a second constraint, where the first fault constraint and the second fault constraint do not have overlapping instructions. The fault monitor system may determine a third constraint to output to a vehicle system of the vehicle based on the presence of both the first fault indication and the second fault indication. For instance, the third constraint may be a different constraint than the first constraint associated with the first fault indication and the second constraint associated with the second fault indication. In this way, the fault monitor system can increase safety of the vehicle and surrounding objects and persons when multiple faults are present, which would not otherwise be addressed by conventional systems that attend to each of the faults individually. For instance, the fault monitor system may map a first fault indication to a voltage constraint having a voltage threshold instruction, and may map a second fault indication to a dynamic constraint having a speed threshold instruction. Based on the presence of both fault indications (despite the constraints being otherwise unrelated), the fault monitor system may output a pull-over constraint that instructs the vehicle to pull over within a predetermined amount of time to receive maintenance in place of the voltage threshold instruction and the speed threshold instruction.

The techniques discussed herein can improve a functioning of a computing device in a number of ways. As discussed above, the fault monitor system may determine how to proceed in the instance of multiple faults present in the vehicle based on a computationally-efficient comparison of instructions included in constraints associated with different fault indications. The instructions output by the fault monitor system can enable the autonomous vehicle to make decisions on how to proceed through the environment earlier and with greater confidence. Additionally, the fault monitor system can provide a more confident trajectory and/or action in response to a fault indication, as the instructions included in the constraints output by the fault monitor system take all faults present in the vehicle into account. Consequently, significantly less processing resources are used in comparison to conventional techniques that may send duplicative instructions to multiple vehicle systems of the vehicle in response to a fault of a vehicle system occurring. In some cases, the described techniques are more accurate than other fault management mechanisms, thus improving safety of the vehicle and surrounding persons and/or vehicles. For instance, prior systems may have attempted to execute multiple instructions based on multiple fault indications (e.g., ranging from similar though not the same to vastly different), which could become dangerous in situations where prioritization of different fault constraints may not be accurately mapped, one to another. However, the described techniques account for fault constraints having different instructions and/or parameters, and cause the vehicle to proceed according to more conservative instructions regardless of a source of the fault indication. Accordingly, controlling the vehicle based in part on comparing and prioritizing individual fault constraint instructions can reduce processing resources, by allowing the vehicle to proceed through the environment more efficiently. By controlling the vehicle based in part on comparing and prioritizing individual fault constraint instructions, the safety of the autonomous vehicle can be improved by making decisions on how to account for all (or multiple) instructions associated with various faults present in the vehicle at the same time. Further, techniques for controlling the vehicle based in part on comparing and prioritizing individual fault constraint instructions can increase a confidence that the vehicle can avoid collisions with objects and/or pedestrians by determining the fault constraints earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 depicts a block diagram of an example fault management system 100 of a vehicle, in accordance with examples of the disclosure. In at least one example, the example fault management system 100 can include a vehicle 102, such as an autonomous, semi-autonomous, or manually controlled vehicle.

The vehicle 102 can include one or more vehicle management components 104. The vehicle management components 104 may provide hardware and/or software to control vehicle components, monitor vehicle components, and/or communicate with other vehicle components, to name a few examples. Illustrated in the example fault management system 100 and included in the vehicle management components 104 are a drive manager component 106, a body manager component 108, a perception component 110, a planning component 112, a remote control component 114, a manual control component 116, a thermo-body component 118, and one or more electronic control unit(s) (ECUs) 120. Other examples of vehicle management components 104 are considered as well.

In examples, the drive manager component 106 may perform functions associated with controlling steering, braking, inverters, traction system(s), parking brake(s), vehicle suspension, and the like, in association with executing a trajectory for the vehicle 102. The body manager component 108, may perform functions associated with windows, doors, mirrors, seats, and so forth. The perception component 110 may perform functions associated with object detection, segmentation, and/or classification, as described in more detail in relation to FIG. 5. The planning component 112 may receive information from the perception component 110, and use such information to generate object predictions and/or generate a trajectory for the vehicle 102 to follow to traverse the environment, also discussed in more detail in relation to FIG. 5. In some examples, the planning component 112 may determine whether a trajectory is feasible for the vehicle 102 to execute or not, such as before the trajectory is supplied to the fault monitor component 126. Additional details regarding determining whether a trajectory is feasible can be found in U.S. patent application Ser. No. 16/539,870, U.S. patent application Ser. No. 16/539,873, and U.S. patent application Ser. No. 16/539,878, which are incorporated by reference herein in their entireties.

The remote control component 114 may perform functions associated with communication between a remote computing device and the vehicle 102, whereby the remote computing device may, at times, control the vehicle (e.g., under the control of a human remote from the vehicle 102 via the remote computing device). The manual control component 116 may enable functionality for a human driver to control the vehicle 102 to traverse the environment. The thermo-body component 118 may monitor and/or regulate temperature of various components of the vehicle 102. In some examples, the ECUs 120 may correspond to any hardware component of the vehicle 102 that may communicate over a network with other systems and/or components of the vehicle 102.

In some examples, any of the vehicle management components 104 may comprise storage storing one or more fault definitions 122. The fault definitions 122 may be associated with a particular fault of the corresponding vehicle management component 104. In some cases, the fault definitions 122 may include information such as a type of fault, a severity of the fault, a threshold value associated with the fault, a requested reaction to the fault, a fault clearing mechanism, and so on. When one of the vehicle management components 104 experiences a fault, the vehicle management component may output a fault indication 124 to a fault monitor component 126.

In some examples, the fault indication 124 may include a fault identification (fault ID) 128, a fault reaction 130, and/or a detection threshold 132. The fault ID 128 may be predetermined based on the particular fault experienced by a component of the vehicle 102 and overseen by the vehicle management component 104. The fault reaction 130 may be a predetermined instruction that is associated with the fault for how the vehicle management component 104 or other component(s) of the vehicle 102 should react to mitigate the fault. The detection threshold 132 may be value that was exceeded by a component of the vehicle that caused the component to output the fault. In some cases, the vehicle management components 104 may output component diagnostics 134 to the fault monitor component 126 as well, which may indicate a status of components monitored by the vehicle management components 104 such as whether a component is on or off, a temperature, a voltage, a current, a speed, a size, a frequency, and the like.

As discussed in more detail below, the fault monitor component 126 may map the fault ID 128 to one or more constraints associated with an action that, when executed by the vehicle 102, may cause the fault to be mitigated or remedied. In some examples, the constraints may be associated with the fault reaction 130 (e.g., the constraint causing the vehicle 102 to perform a same or similar action as the fault reaction 130 otherwise would). However, in some cases, the fault monitor component 126 may determine a constraint for the vehicle 102 that changes and/or supplements the fault reaction 130, such that the vehicle 102 is instructed to perform a different action as a result of the constraint than the vehicle would perform if the vehicle relied solely upon the fault reaction 130. Additional details regarding how a fault monitor may collect fault information from various vehicle components can be found in U.S.

patent application Ser. No. 16/539,870, U.S. patent application Ser. No. 16/539,873, and U.S. patent application Ser. No. 16/539,878, which are incorporated by reference herein in their entireties.

Once the fault monitor component 126 determines a constraint to be applied by the vehicle to resolve the fault, the fault monitor component 126 may generate a fault monitor output 136. The fault monitor output 136 may include the constraint and an indication of the vehicle management components 104 that are responsible for performing actions to execute the constraint. For example, the fault monitor component 126 may output the fault monitor output 136 to the vehicle management component 104 from which the fault indication 124 was received. Alternatively or additionally, the fault monitor component 126 may output the fault monitor output 136 to a different one (or more) of the vehicle management components 104 to perform actions to execute the constraint other than the vehicle management component 104 from which the fault indication 124 was received. Thus, the fault monitor component 126 serves as a central location to receive fault indications from multiple vehicle systems, and distribute constraints throughout the vehicle 102 to efficiently and safely mitigate the fault.

In some examples, the fault monitor component 126 may output the fault monitor output 136 to a fault sharing gateway 138 as well. The fault sharing gateway 138 may determine information within the fault monitor output 136 and transmit the information as part of a fault output 140 to a vehicle display 142, as appropriate. For instance, if the fault monitor output 136 contains an instruction to cause the vehicle 102 to pull over within a certain amount of time (e.g., 2 minutes), the fault sharing gateway 138 may generate the fault output 140 to display a message to a passenger inside of the vehicle 102 that the vehicle 102 will be stopping shortly, and/or may provide an indication to the passenger of the fault that caused the constraint to be issued.

In examples, the fault sharing gateway 138 may receive the component diagnostics 134 as well. The fault sharing gateway 138 may generate a fault output 144 that includes the component diagnostics 134 and/or information included in the fault monitor output 136. The fault sharing gateway 138 may transmit the fault output 144 via a network 146 (e.g., a wired or wireless network) to one or more remote computing device(s) 148. For instance, the remote computing device 148 may be a computing device having at least one processor 150 and memory 152, and in some cases may be associated with a maintenance system to provide maintenance to the various components of the vehicle 102. Accordingly, the fault output 144 may provide the remote computing device 148 and/or a person using the remote computing device 148 with a comprehensive package of information related to a status of the various vehicle components that includes faults in the fault output 144, component diagnostics 134 of properly functioning vehicle components, and/or component diagnostics 134 of vehicle components experiencing faults. This information may be used to provide maintenance to the vehicle 102 as appropriate.

Figure 2:
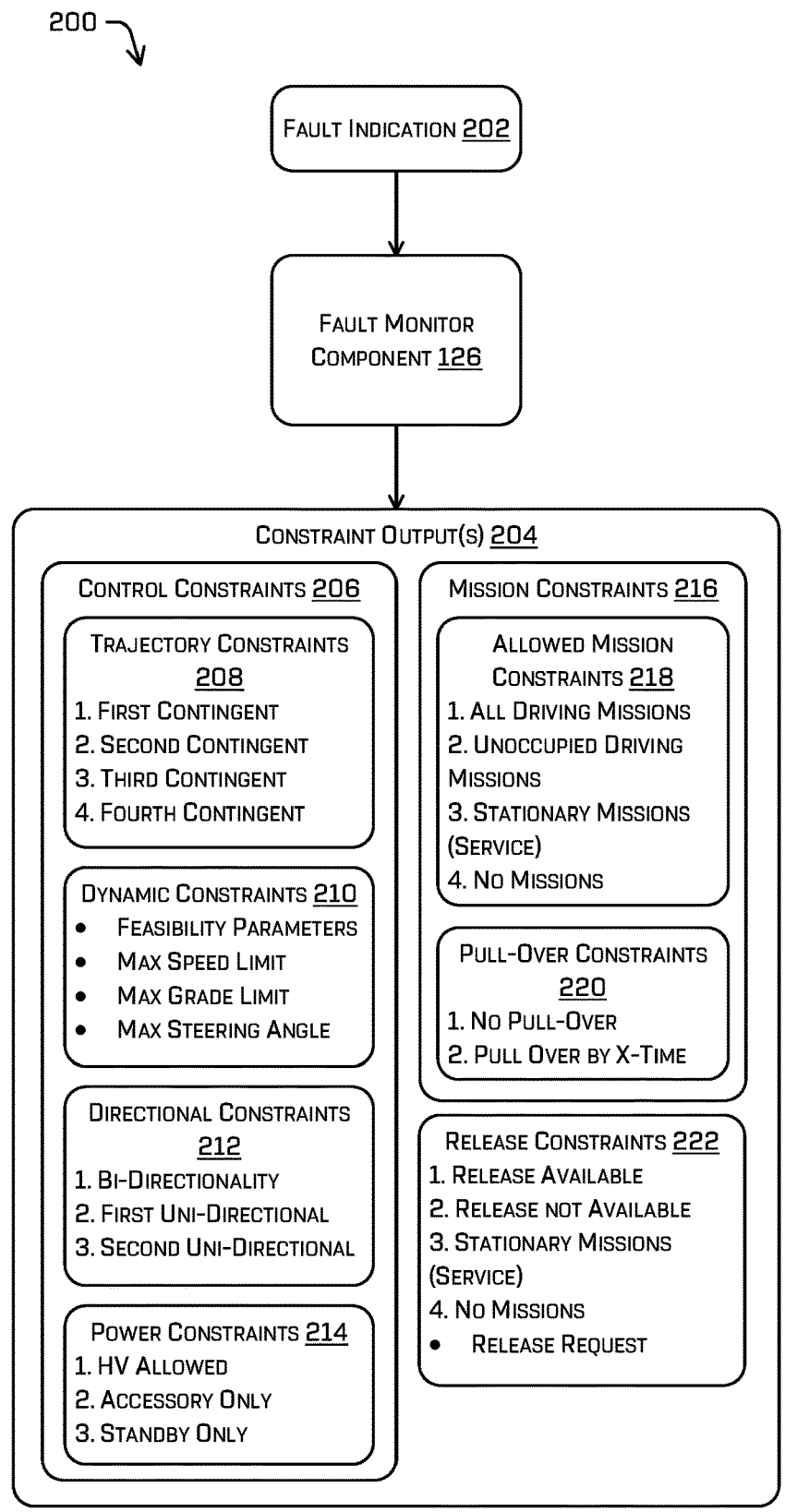
FIG. 2 is an illustration of an example system including constraint outputs by a fault monitor component in response to a fault indication, in accordance with examples of the disclosure.

FIG. 2 is an illustration of an example system 200 including constraint outputs by a fault monitor component in response to a fault indication, in accordance with examples of the disclosure.

The example system 200 includes the fault monitor component 126 of FIG. 1, which may receive a fault indication 202 from one of the vehicle management components 104 as described above. The fault monitor component 126 may map information included in the fault indication 202 (e.g., the fault ID 128 and/or the fault reaction 130) to a corresponding constraint. The fault monitor component 126 may output, based on the mapping, one or more constraint output(s) 204 to an appropriate vehicle management system 104 to execute an action according to the constraint indicated in the constraint output 204. The restrictions included in the individual constraint outputs 204 may be listed in a descending order of restrictiveness on actions performed by the vehicle 102 when numerals are present, where 1 may correspond to a least restrictive constraint on an action, 2 may correspond to a more restrictive constraint on the action than 1, 3 may correspond to a more restrictive constraint on the action than 1 and 2, and so forth.

The constraint outputs 204 may include control constraints 206 that constrain actions related to how the vehicle 102 itself operates. In some examples, the control constraints 206 may include trajectory constraints 208 that correspond to different types of contingent trajectories that the vehicle 102 may be constrained to follow. A first contingent may correspond to all trajectories that the planning component 112 may output (e.g., a nominal trajectory according to a plan without a presence of a fault). Despite being able to execute all trajectories according to the first contingent, the vehicle 102 may output information associated with the fault indication 202 to a remote computing device (e.g., when a maintenance operation may be needed but does not prevent the vehicle from operating). A second contingent may correspond to a constraint that requires the vehicle 102 to pull over within a predetermined amount of time (e.g., 30 seconds, 1 minute, 2 minutes, 5 minutes, etc.), and/or at a particular location type (e.g., a parking lot, a recharging station, a maintenance location, etc.). A third contingent may correspond to a constraint that requires the vehicle 102 to pull over within a predetermined amount of time that is less than the predetermined amount of time associated with the second contingent (e.g., 15 seconds, 30 seconds, 1 minute, etc.), and/or at a side of the road or any other safe and legal location within a predetermined distance (e.g., 400 feet, half a mile, one mile, etc.). A fourth contingent may correspond to a constraint that requires the vehicle 102 to stop immediately.

In some examples, the control constraints 206 may also include dynamic constraints 210 that may correspond to how the vehicle 102 may proceed through the environment, and/or restrictions on the environment that the vehicle 102 may traverse through. For instance, the dynamic constraints 210 may include feasibility parameters that may restrict environmental conditions that the vehicle 102 may traverse through, such as weather restrictions (e.g., related to snow, rain, temperature, wind speed, etc.), terrain restrictions (e.g., gravel roads, dirt roads, bridges, train tracks, etc.), a geographic region restrictions (e.g., city, suburb, rural, etc.), traffic restrictions (e.g., stop-and-go traffic, traffic traveling at a minimum or maximum speed, etc.), road network restrictions (e.g., side roads, arterials, highways, interstates, etc.), and the like. Alternatively or additionally, the dynamic constraints 210 may include a maximum (or minimum) speed limit (e.g., 5 mph, 20 mph, 35 mph, 50 mph, etc.). In examples, the dynamic constraints 210 may include a maximum (or minimum) grade limit that the vehicle 102 may traverse (e.g., 15 degrees, 20 degrees, 30 degrees, etc.). In some cases, the dynamic constraints 210 may include a maximum (or minimum) steering angle that the vehicle 102 may perform (e.g., 20 degrees, 30 degrees, 45 degrees, 90 degrees, etc.). The steering angle may be, in some examples, a constant steering angle, and/or may be dictated based on a speed of the vehicle 102 (e.g., a permitted steering angle of 90 degrees at or below 20 mph and a permitted steering angle of 45 degrees above 20 mph, to name one illustrative example). The dynamic constraints 210 may also include constraints relating to a number of wheels that may be used to control steering of the vehicle (e.g., two-wheel steering, four-wheel steering, etc.).

The control constraints 206 may further include directional constraints 212 that may constrain a direction that the vehicle 102 may proceed through the environment. In some examples, the vehicle 102 may be a bi-directional vehicle that is configured to proceed through the environment in a forward direction (e.g., according to a direction of traffic) with either one of at least two ends of the vehicle in a "front" of the traveling direction. The directional constraints 212 may include a bi-directional restriction, where the vehicle 102 may proceed in either of two directions in spite of the presence of the fault indication 202. Similar to the trajectory constraints 208, the vehicle 102 may output information associated with the fault indication 202 when the bi-directional restriction is in place to a remote computing device (e.g., when a maintenance operation may be needed but does not prevent the vehicle from operating). The directional constraints 212 may also include a first uni-directional restriction and a second uni-directional restriction, which correspond to restrictions on the vehicle 102 to proceed in only one of the two bi-directional directions.

In some examples, the control constraints 206 may include power constraints 214 that restrict power usage by one or more components and/or systems of the vehicle 102. The power constraints 214 may include a high-voltage (HV) allowed restriction, that allows power to be used by the components and/or systems of the vehicle 102 according to normal operating functions. Similar to the trajectory constraints 208 and the directional constraints 212, the vehicle 102 may output information associated with the fault indication 202 when the HV allowed restriction is in place to a remote computing device (e.g., when a maintenance operation may be needed but does not prevent the vehicle from operating). In examples, the power constraints 214 may include an accessory only restriction, in which functionality associated with predetermined components may be permitted (e.g., display screen, radio, lights, fan, HVAC, etc.), but other predetermined components are not permitted to operate (e.g., motor, drive controller, etc.). In some cases, the power constraints 214 may include a standby only restriction, in which background components (e.g., clock, security system, etc.) are permitted to operate, but no other systems are permitted to operate.

The constraint outputs 204 may include mission constraints 216 that constrain which types of missions the vehicle 102 may undertake. For instance, an air conditioning system of the vehicle 102 may not be functioning, but other systems of the vehicle 102 may be operating properly. In this example, the vehicle 102 may be permitted to proceed to a maintenance location to receive maintenance on the air conditioning system as normal, but may not be permitted to transport passengers (due to possible temperature discomfort in a cabin of the vehicle 102) until the air conditioning system is repaired. Accordingly, the mission constraints 216 may include allowed mission constraints 218 that provide instructions on missions that the vehicle 102 is allowed to take on. The allowed mission constraints 218 may include an all driving missions restriction, that permits the vehicle 102 to perform multiple types of driving missions, e.g., with and without passengers. Similar to the trajectory constraints 208 and the directional constraints 212, the vehicle 102 may output information associated with the fault indication 202 when the all missions restriction is in place to a remote computing device (e.g., when a maintenance operation may be needed but does not prevent the vehicle from operating). The allowed mission constraints 218 may include an unoccupied driving missions restriction that allows the vehicle 102 to proceed through the environment without passengers inside of the vehicle. In some examples, the allowed mission constraints 218 may include a stationary missions restriction, which may permit functionality necessary for service and/or maintenance of the vehicle 102. The allowed mission constraints 218 may further include a no missions restriction that may prevent the vehicle 102 from taking on any missions.

In some examples, the mission constraints 216 may also include pull-over constraints 220 that provide instructions relating to how, where, and/or when the vehicle 102 should pull over to resolve a fault included in the fault indication 202. The pull-over constraints 220 may include a no-pull over restriction indicating that the vehicle 102 does not need to pull over to resolve the fault, and/or should not pull over to resolve the fault. The pull-over constraints 220 may also include a pull over by x-time (and/or x-distance) restriction that provides a maximum time (e.g., 30 seconds, 1 minute, 5 minutes, 10 minutes, etc.) and/or a maximum distance (e.g., 400 feet, half a mile, one mile, etc.) within which the vehicle 102 is to pull over to resolve the fault.

In examples, the constraint outputs 204 may include release constraints 222 that provide restrictions relating to how, where, and/or when the vehicle 102 may return to normal operation when a fault included in the fault indication 202 is resolved. The release constraints 222 may include a release available restriction in which the vehicle may resume normal operations upon the fault monitor component 126 receiving an indication that the fault has been resolved. In some examples, the release constraints 222 may include a release not available restriction, where the fault monitor component 126 is not permitted to independently release the vehicle 102 to resume normal operations without receiving a permitting instruction from a remote computing device and/or a human. The release constraints 222 may include a stationary missions restriction, in which the vehicle 102 may undertake necessary operations to arrive at a service location to receive service associated with the fault. In some cases, the release constraints 222 may include a no missions restriction, in which even when the fault is resolved, the vehicle 102 may not undertake any additional missions. Any one of the release constraints 222 may be associated with a release request, which enables a human to release the vehicle 102 to perform actions (e.g., proceed normally) to traverse the environment and/or to receive service or maintenance.

Figure 3:
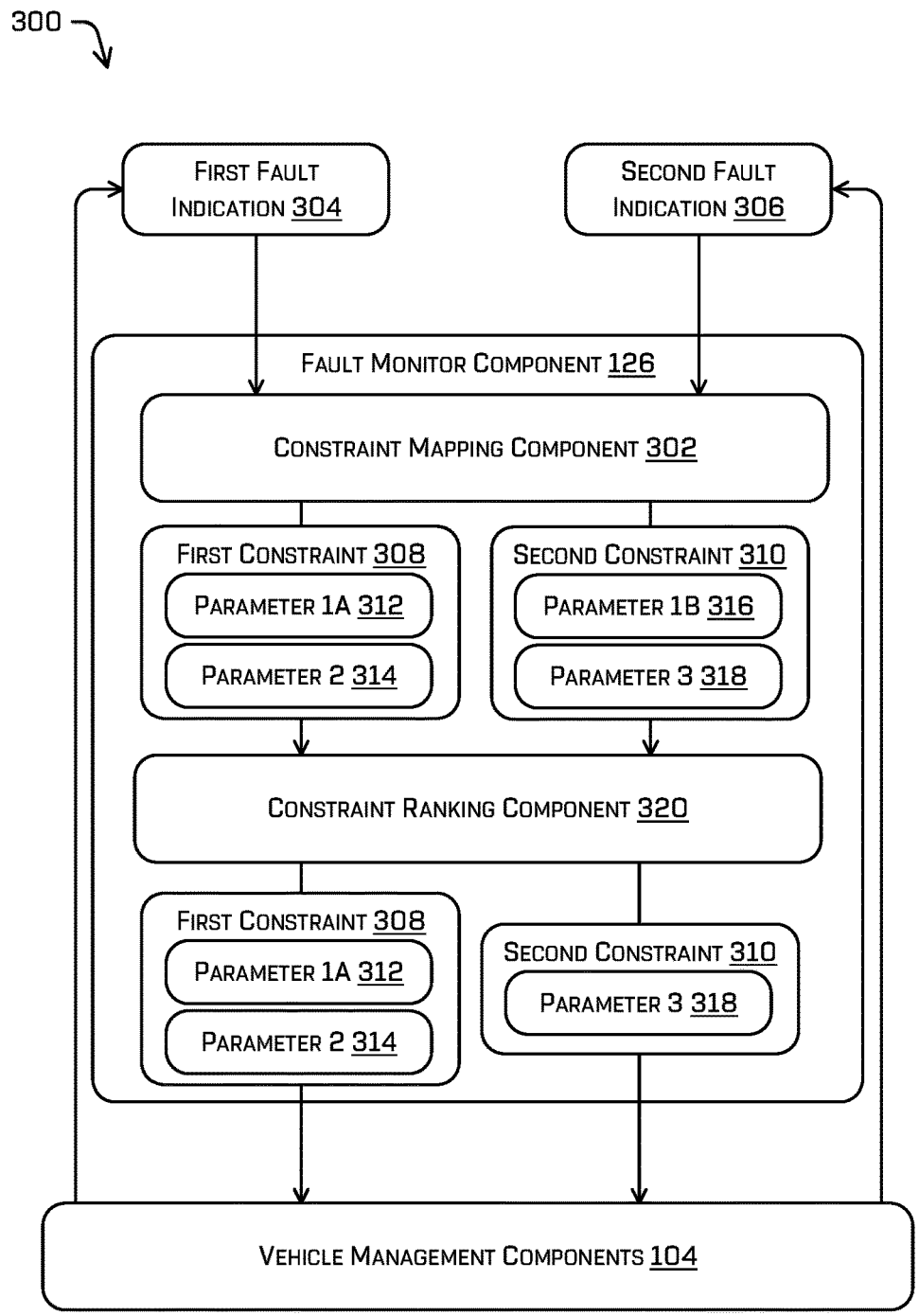
FIG. 3 is an illustration of an example system for mapping multiple fault indications to respective constraints, and ranking parameters of the constraints, in accordance with examples of the disclosure.

FIG. 3 is an illustration of an example system 300 for mapping multiple fault indications to respective constraints, and ranking parameters of the constraints, in accordance with examples of the disclosure.

In some examples, the fault monitor component 126 (of FIG. 1) may include a constraint mapping component 302 that is configured to map the fault ID 128 and/or fault reaction 130 included in a fault indication 124 to one or more constraints, as described in relation to FIG. 2. In the example system 300, the constraint mapping component 302 may receive a first fault indication 304 and a second fault indication 306 from the vehicle management components 104, each of which may correspond to the fault indication 124 of FIG. 1. In at least some examples, a presence of the first fault indication 304 and a presence of the second fault indication 306 may at lest partially overlap in time, such that both are present together for at least a period of time.

The fault monitor component 126 may output a first constraint 308 associated with the first fault indication 304, and may output a second constraint 310 associated with the second fault indication 306. The first constraint 308 and the second constraint 310 may each correspond to any one of the constraint outputs 204 described in relation to FIG. 2. In some examples, the first constraint 308 may include a parameter 1A 312, and a parameter 2 314. In an illustrative example, the first constraint 308 may correspond to the dynamic constraints 210, where the parameter 1A 312 corresponds to a max speed limit of 20 mph and the parameter 2 314 corresponds to a restriction in which the vehicle 102 is prohibited from traversing the environment if it is raining. The second constraint 310 may include a parameter 1B 316, and a parameter 3 318. Continuing with the above example, the second constraint 310 may correspond to the trajectory constraints 208, where the parameter 1B 316 may correspond to a trajectory that does not exceed 35 mph, and the parameter 3 318 may correspond to the trajectory pulling over within 2 minutes.

The constraint mapping component 302 may output the first constraint 308 and the second constraint 310 to a constraint ranking component 320 of the fault monitor component 126. The constraint ranking component 320 may be configured to compare parameters between different constraints to determine whether any of the parameters have overlapping functionality to be performed by the vehicle 102. Additionally, in some cases, the constraint ranking component 320 may select a more conservative of the parameters included in the multiple constraints that have overlapping functionality, such that the vehicle performs actions according to the safest constraints that are least likely to endanger surrounding persons and objects in the environment.

Continuing with the example above, the constraint ranking component 320 may determine that the parameter 1A 312 included in the first constraint (e.g., a max speed limit of 20 mph) overlaps with the parameter 1B 316 (e.g., a trajectory that does not exceed 35 mph), such as both parameters including a maximum speed to be executed by the vehicle 102. The constraint ranking component 320 may determine that the parameter 1A 312 is more restrictive (e.g., more conservative) than the parameter 1B 316, as the parameter 1A 312 causes the vehicle 102 to drive more slowly. Consequently, the constraint ranking component 320 may remove the parameter 1B 316 from the second constraint 310, before the second constraint 310 is output to the vehicle management components 104 to control the speed of the vehicle 102. The constraint ranking component 320 may output both the first constraint 308 (including the parameter 1A 312 and the parameter 2 314) and the second constraint 310 as modified (including the parameter 3 318) to the vehicle management components 104 responsible for executing actions associated with the constraints 308 and 310, such as trajectory, speed, and pull over time as noted above.

Figure 4:
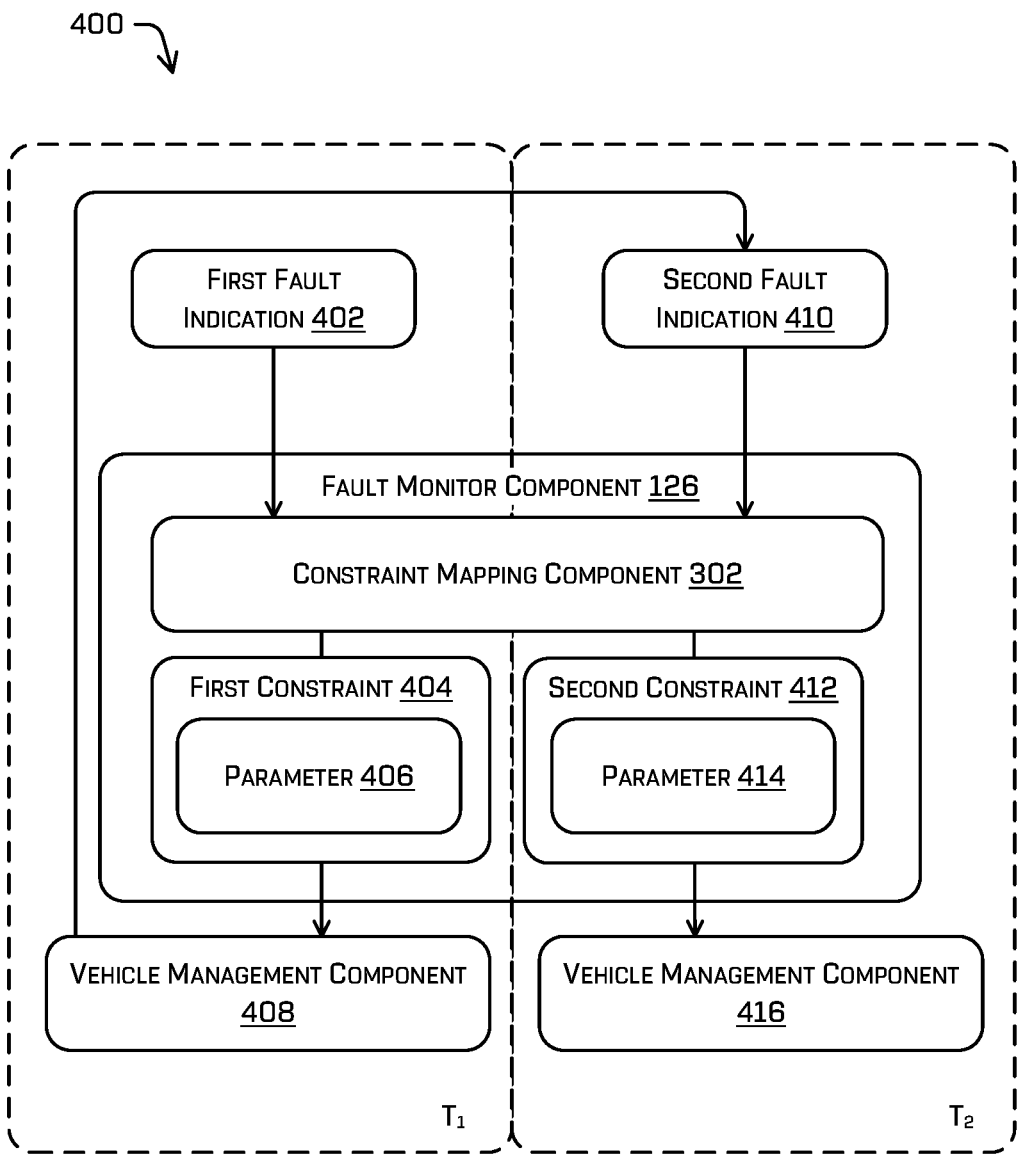
FIG. 4 is an illustration of an example system for determining a second constraint for a second vehicle system following a first constraint failing to be executed by a first vehicle system, in accordance with examples of the disclosure.

FIG. 4 is an illustration of an example system 400 for determining a second constraint for a second vehicle system following a first constraint failing to be executed by a first vehicle system, in accordance with examples of the disclosure.

In some examples, the fault monitor component 126 (of FIG. 1) may include the constraint mapping component 302 that is configured to map the fault ID 128 and/or fault reaction 130 included in a fault indication 124 to one or more constraints, as discussed above. In the example system 400, the constraint mapping component 302 may receive a first fault indication 402 from one of the vehicle management components 104 of FIG. 1 (not shown for clarity) at a first time $T_1$. The constraint mapping component 302 may map the first fault indication 402 to a corresponding first constraint 404, where the first constraint 404 comprises a parameter 406. In examples, the first constraint 404 is output to a vehicle management component 408, to cause a component controlled by the vehicle management component 408 to perform an action according to the parameter 406. In an illustrative example, the first constraint 404 may correspond to one of the power constraints 214 of FIG. 2, where the parameter 406 instructs the vehicle management component 408 to keep a voltage used by a component of the vehicle below a threshold voltage, but the vehicle may otherwise proceed as normal.

In some cases, the constraint mapping component 302 may receive a second fault indication 410 at a time $T_2$, where the second fault indication 410 may be output by the vehicle management component 408 and/or a sensor of the vehicle. The second fault indication 410 may be output as a result of the vehicle management component 408 (or an associated component controlled and/or monitored by the vehicle management component 408) failing to comply with the parameter 406 included in the first constraint 404. For instance, a sensor of the vehicle may output sensor data indicative of a vehicle state of the vehicle, such as a voltage indication associated with a component of the vehicle according to the illustrative example above. Other vehicle states may include a trajectory being followed by the vehicle, a direction of travel of the vehicle, a geolocation of the vehicle, a voltage request from one or more vehicle systems, and the like. One of the vehicle management components 104 (e.g., the vehicle management component 408 and/or a different component) may generate the second fault indication 410 based on determining that the vehicle management component 408 is failing to enforce the first constraint 404, and/or if a component is failing to comply with the first constraint 404 (e.g., as indicated by a signal corresponding to the time $T_1$ to the time $T_2$).

Based on the presence of the first constraint 404 being output to the vehicle management component 408 at the time $T_1$ and the presence of the second fault indication 410 at the time $T_2$, the constraint mapping component 302 may determine that a constraint should be escalated to another vehicle management system to minimize damage to the vehicle and/or to ensure safety of passengers and surrounding persons and objects. Accordingly, the constraint mapping component 302 may output a second constraint 412 that includes a parameter 414 to a vehicle management component 416, where the vehicle management component 416 is a different component than the vehicle management 408. The second constraint 412 may instruct the vehicle management component 416 to perform a second, different action than the action associated with the first constraint 404 and the parameter 406. Consider once more the illustrative example above in which the first constraint 404 instructs the vehicle management component 408 to keep a voltage of a component below a threshold voltage. The second fault indication 410 may indicate that the voltage continues to exceed the threshold voltage at the time $T_2$. Therefore, the constraint mapping component 302 may generate the second constraint 412 to be one of the pull-over constraints 220, where the parameter 414 indicates that the vehicle is to pull over and turn off within an amount of time (e.g., one minute), to stop the voltage output completely.

Figure 5:
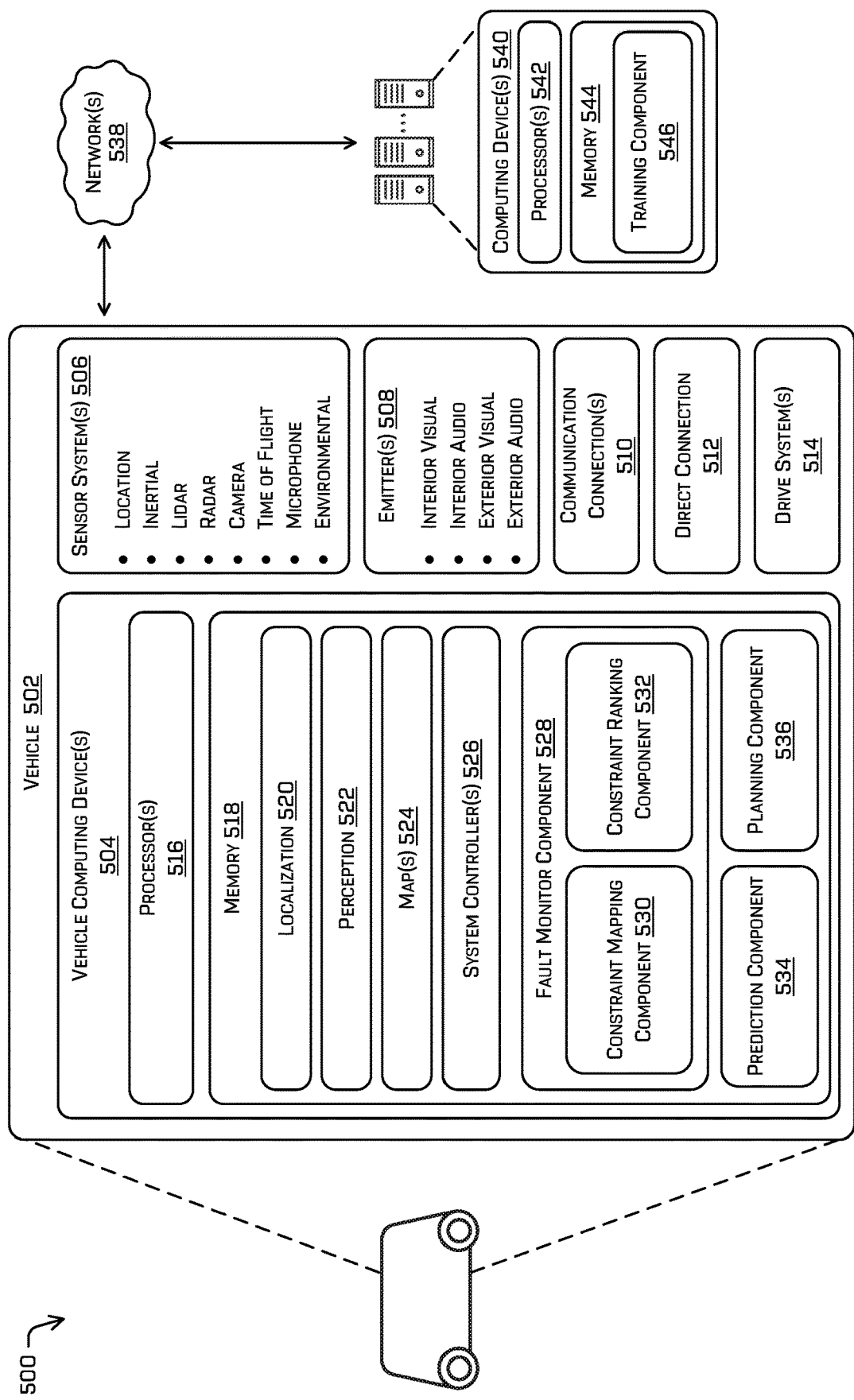
FIG. 5 depicts a block diagram of an example system for implementing the techniques described herein.

FIG. 5 depicts a block diagram of an example system 500 for implementing the techniques described herein. In at least one example, the system 500 can include a vehicle 502, such as an autonomous, semi-autonomous, or manually controlled vehicle. In some examples the vehicle 502 may correspond to the vehicle 102 of FIG. 1.

The vehicle 502 can include vehicle computing device(s) 504, one or more sensor systems 506, one or more emitters 508, one or more communication connections 510, at least one direct connection 512, and one or more drive systems 514.

The vehicle computing device(s) 504 can include one or more processors 516 and memory 518 communicatively coupled with the one or more processors 516. In the illustrated example, the vehicle 502 is an autonomous vehicle; however, the vehicle 502 could be any other type of vehicle or robotic platform. In the illustrated example, the memory 518 of the vehicle computing device(s) 504 stores a localization component 520, a perception component 522, one or more maps 524, one or more system controllers 526, a fault monitor component 528, a constraint mapping component 530, a constraint ranking component 532, a prediction component 534, and a planning component 536. Though depicted in FIG. 5 as residing in the memory 518 for illustrative purposes, it is contemplated that the localization component 520, the perception component 522, the one or more maps 524, the one or more system controllers 526, the fault monitor component 528, the constraint mapping component 530, the constraint ranking component 532, the prediction component 534, and the planning component 536 can additionally, or alternatively, be accessible to the vehicle 502 (e.g., stored on, or otherwise accessible by, memory remote from the vehicle 502).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory, for determining to retrieve map data, and so forth, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, truck, pedestrian, cyclist, animal, building, tree, road surface, curb, sidewalk, stoplight, stop sign, lane marker, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 522 performs detection, the perception component 522 may output detections of objects in an image. Such detections may comprise two-dimensional bounding boxes and/or masks of detected objects. In some examples, such detection may utilize a machine learning approach (e.g., scale-invariant feature transform (SIFT), histogram of oriented gradients (HOG), etc.) followed by a support vector machine (SVM) to classify objects depicted in images received from a camera of the sensor system 506. Alternatively or additionally, detection may utilize a deep learning approach based on a convolutional neural network (CNN) to classify objects depicted in images received from a camera of the sensor system 506. As described herein, the perception component 522 may output detections of objects and/or other processed sensor data to the planning component 536 at intervals, thus allowing the planning component 536 to make object predictions and/or generate a trajectory for the vehicle 502 to follow to traverse the environment.

In some examples, the one or more maps 524 can be stored on a remote computing device(s) (such as the computing device(s) 540) accessible via network(s) 538. In some examples, multiple maps 524 can be stored based on, for example, a characteristic (e.g., type of entity, time of day, day of week, season of the year, etc.). Storing multiple maps 524 can have similar memory requirements, but increase the speed at which data in a map can be accessed. In some examples, the one or more maps 524 can store sizes or dimensions of objects associated with individual locations in an environment. For example, as the vehicle 502 traverses the environment and as maps representing an area proximate to the vehicle 502 are loaded into memory, one or more sizes or dimensions of objects associated with a location can be loaded into memory as well.

The prediction component 534 can generate predictions of object behavior based at least in part on sensor data received form the sensor system 506. For example, the prediction component 534 may generate one, or multiple, predicted trajectories for an object detected in the environment. Additionally, in some cases, the prediction component 534 can determine variances in position, location, speed, acceleration, and the like for each predicted trajectory generated for a particular object. The prediction component 534 may output the predicted trajectories to the planning component 536 (e.g., at intervals) to use in generating a trajectory for the vehicle 502 to follow to traverse the environment.

In general, the planning component 536 can determine a path for the vehicle 502 to follow to traverse the environment. For example, the planning component 536 can determine various routes and trajectories and various levels of detail. For example, the planning component 536 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 536 can generate an instruction for guiding the autonomous vehicle along at least a portion of the route from the first location to the second location. In at least one example, the planning component 536 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate. In some examples, the planning component 536 can use temporal logic, such as linear temporal logic and/or signal temporal logic, to evaluate one or more trajectories of the vehicle 502.

The fault monitor component 528 may receive fault indications from various systems of the vehicle, such as the sensor systems 506, the drive systems 514, localization component 520, the perception component 522, the system controllers 526, the predication component 534, and/or the planning component 536, among others as described herein. Additionally, the fault monitor component 528 may distribute constraints to various vehicle systems based on an overall perspective of all (or multiple) faults present in the vehicle 502 to minimize damage to the vehicle while ensuring safety for passengers and persons and objects in the environment.

For instance, the fault monitor component 528 may include a constraint mapping component 530 (which may correspond to the constraint mapping component 302 described above). The constraint mapping component 530 may receive fault indications from the various vehicle systems and map a fault ID and/or a fault reaction included in a fault indication to a corresponding constraint that corresponds to an action to be performed by the vehicle 502 to mitigate the fault. In some examples, the constraint mapping component 530 may determine a different constraint to apply to one or more vehicle systems that does not necessarily directly map to individual faults themselves. For instance, if a vehicle system fails to enforce a first constraint within a threshold amount of time (e.g., 10 seconds, 1 minute, 5 minutes, etc.), the constraint mapping component 530 may output a second constraint to another vehicle system to perform a different action to mitigate the fault. In some cases, when multiple faults are present, the constraint mapping component 530 may use constraints that were previously present to inform and/or alter constraints for subsequent faults that the constraint mapping component 530 receives.

The constraint ranking component 532 may receive constraints output by the constraint mapping component 530 (e.g., direct mapping from individual fault indications) and determine which parameters included in individual constraints to send to the vehicle systems to be enforced in actions performed by the vehicle 502. For example, if two constraints output by the constraint mapping component 530 have a parameter with different values (e.g., a first pull-over time of one minute and a second pull-over time of five minutes), the constraint ranking component 532 may apply a more conservative of the two same parameters in a constraint to be output to an appropriate vehicle system. In some cases, if two constraints include different parameters but may nonetheless conflict with one another, the constraint ranking component 532 may determine which of the parameters included in the different constraints to apply. In an illustrative example, a first constraint may instruct the vehicle to proceed in one direction (rather than bi-direction-ally) and a second constraint may instruct the vehicle to only utilize standby power. In such a case, the constraint relating to standby power will be enforced and the constraint related to proceeding in a single direction may not be output to a vehicle system until the standby power constraint is resolved.

In at least one example, the vehicle computing device(s) 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

As can be understood, the components discussed herein (e.g., the localization component 520, the perception component 522, the one or more maps 524, the one or more system controllers 526, the fault monitor component 528, the constraint mapping component 530, the constraint ranking component 532, the prediction component 534, and/or the planning component 536) are described as divided for illustrative purposes. However, the operations performed by the various components can be combined or performed in any other component. By way of example, functions described in relation to the fault monitor component 528, the constraint mapping component 530, the constraint ranking component 532, the prediction component 534, and/or the planning component 536 may be performed by the perception component 522 to reduce the amount of data transferred by the system.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the lidar sensors can include individual lidar sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504. Additionally or alternatively, the sensor system(s) 506 can send sensor data, via the one or more networks 538, to the one or more computing device(s) at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communication connection(s) 510 also enable the vehicle 502 to communicate with a remote teleoperations computing device or other remote services.

The communication connection(s) 510 can include physical and/or logical interfaces for connecting the vehicle computing device(s) 504 to another computing device or a network, such as network(s) 538. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 5G, 5G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the localization component 520, the perception component 522, the one or more maps 524, the one or more system controllers 526, the fault monitor component 528, the constraint mapping component 530, the constraint ranking component 532, the prediction component 534, and/or the planning component 536 can process sensor data, as described above, and can send their respective outputs, over the one or more network(s) 538, to one or more computing device(s) 540. In at least one example, the localization component 520, the perception component 522, the one or more maps 524, the one or more system controllers 526, the fault monitor component 528, the constraint mapping component 530, the constraint ranking component 532, the prediction component 534, and/or the planning component 536 can send their respective outputs to the one or more computing device(s) 540 at a particular frequency, after a lapse of a predetermined period of time, in near real-time, etc.

In some examples, the vehicle 502 can send sensor data to one or more computing device(s) 540 via the network(s) 538. In some examples, the vehicle 502 can send raw sensor data to the computing device(s) 540. In other examples, the vehicle 502 can send processed sensor data and/or representations of sensor data to the computing device(s) 540. In some examples, the vehicle 502 can send sensor data to the computing device(s) 540 at a particular frequency, after a lapse of a predetermined period of time, in near real-time, etc. In some cases, the vehicle 502 can send sensor data (raw or processed) to the computing device(s) 540 as one or more log files.

The computing device(s) 540 can include processor(s) 542 and a memory 544 storing a training component 546.

In some instances, the training component 546 can include functionality to train one or more models to detect objects in an environment, predict object behavior, and the like. For instance, aspects of some or all of the components discussed herein can include any models, algorithms, and/or machine learning algorithms. For example, in some instances, the components in the memory 544 (and the memory 518, discussed above) can be implemented as a neural network. In some examples, the training component 546 can utilize a neural network to generate and/or execute one or more models to improve various aspects of object behavior prediction for use in trajectory planning of the vehicle 502.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 516 of the vehicle 502 and the processor(s) 542 of the computing device(s) 540 can be any suitable processor capable of executing instructions to process data and perform operations as described herein. By way of example and not limitation, the processor(s) 516 and 542 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 544 are examples of non-transitory computer-readable media. The memory 518 and 544 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 540 and/or components of the computing device(s) 540 can be associated with the vehicle 502. That is, the vehicle 502 can perform one or more of the functions associated with the computing device(s) 540, and vice versa. Further, aspects of the fault monitor component 528, the prediction component 534 and/or the planning component 536 can be performed on any of the devices discussed herein. For example, any or all of the functionality and components described with reference to FIGS. 1-4 can be implemented by the planning component 536 or other components of vehicle 502.

Figure 6:
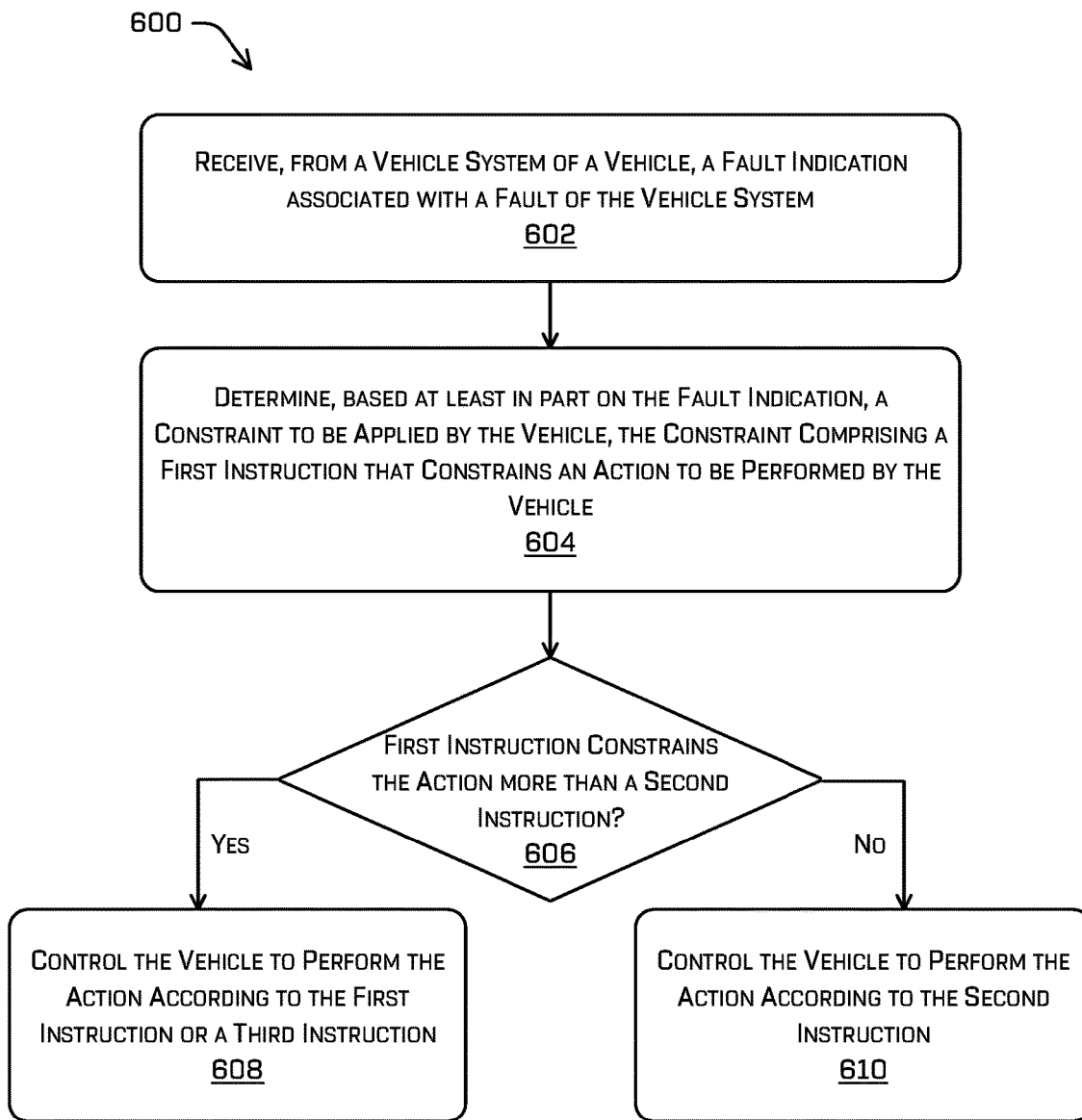
FIG. 6 depicts an example process for determining a constraint to be applied by a vehicle based on a fault identification associated with a fault of a vehicle system, and controlling the vehicle based in part on whether the constraint contains an instruction that constrains the vehicle more or less than a second instruction, in accordance with examples of the disclosure.

FIG. 6 depicts an example process for determining a constraint to be applied by a vehicle based on a fault indication associated with a fault of a vehicle system, and controlling the vehicle based in part on whether the constraint contains an instruction that constrains the vehicle more or less than a second instruction, in accordance with examples of the disclosure. For example, some or all of the process 600 can be performed by one or more components in FIGS. 1 and/or 5, as described herein. For example, some or all of the process 600 can be performed by the vehicle computing device(s) 504, the computing device(s) 540, or any other computing device or combination of computing devices. Further, any of the operations described in the example process 600 may be executed in parallel, in a different order than depicted in the process 600, omitted, combined with other processes such as the process 700, and the like.

An operation 602 includes receiving, from a vehicle system of a vehicle, a fault indication associated with a fault of the vehicle system. In some examples, the fault monitor component 126 may receive the fault indication 124 from a vehicle management component 104 in response to a fault experienced by a component of the vehicle 102 monitored by the corresponding vehicle management component 104. The fault indication 124 may include information such as a fault ID 128, a fault reaction 130, and/or a detection threshold 132 that correspond to the fault being experienced by the component.

An operation 604 includes determining, based at least in part on the fault indication, a constraint to be applied by the vehicle, where the constraint comprises a first instruction that constrains an action to be performed by the vehicle. For instance, a constraint output to the planning component 112 may be one of the dynamic constraints 210 having an instruction relating to feasibility parameters or steering controls, may be one of the trajectory constraints 208 having an instruction restricting allowed trajectories that the vehicle 102 may follow, may be one of the directional constraints 212 indicating whether the vehicle may proceed bidirectionally or unidirectionally, may be one of the pull-over constraints 220 instructing the vehicle 102 to pull over within a predetermined time or distance, and so forth. In examples, a constraint output to a collision avoidance system of the vehicle 102 may be one of the trajectory constraints 208 having an instruction restricting allowed trajectories that the vehicle 102 may follow, and/or may be one of the dynamic constraints 210 having an instruction relating to feasibility parameters or steering controls, and so on. A constraint output to a vehicle dispatch system may be one of the allowed mission constraints 218, to ensure that the vehicle 102 is being dispatched to a permitted mission type. In some examples, a constraint output to the drive manager component 106 may be one of the release constraints 222 permitting the vehicle 102 to move or remain stopped, may be one of the dynamic constraints 210 such as maximum speed, may be one of the allowed mission constraints 218 instructing whether to permit a passenger to enter the vehicle (e.g., by preventing or enabling doors of the vehicle to open), may be one of the dynamic constraints 210 having an instruction relating to feasibility parameters or steering controls, may be one of the trajectory constraints 208 having an instruction restricting allowed trajectories that the vehicle 102 may follow, and the like.

An operation 606 includes determining whether the first instruction constrains the action more than a second instruction. In some cases, a common parameter may be included in two constraints that are associated with two different faults that at least partially overlap in time. For example, if two constraints output by the constraint mapping component 302 have a parameter corresponding to a similar action but having different values (e.g., a first pull-over time of one minute and a second pull-over time of five minutes), the constraint ranking component 320 may apply a more conservative of the two same parameters in a constraint to be output to an appropriate vehicle system. In some cases, if two constraints include different parameters but may nonetheless conflict with one another, the constraint ranking component 320 may determine which of the parameters included in the different constraints to apply. Alternatively or additionally, the constraint mapping component 302 may determine a third constraint that does not directly map to the first two constraints directly based on the presence of both of the first two fault indications at least partially overlapping in time. For instance, the constraint mapping component 302 may map a first fault indication to a voltage constraint having a voltage threshold instruction, and may map a second fault indication to a dynamic constraint having a speed threshold instruction. Based on the presence of both fault indications (despite the constraints being otherwise unrelated), the fault monitor component 126 may output a pull-over constraint that instructs the vehicle to pull over within a predetermined amount of time to receive maintenance in place of the voltage threshold instruction and the speed threshold instruction.

For example, if the response to the operation 606 is "Yes" (e.g., the first instruction constrains the action more than the second instruction), the process may proceed to operation 608, in which the vehicle is controlled to perform the action according to the first instruction or a third instruction. In examples, the third instruction may correspond to a more conservative instruction than either the first instruction or the second instruction and be output based on the presence of two (or more) fault indications being present. If the response to the operation 606 is "No" (e.g., the second instruction constrains the action more than the first instruction), the process may proceed to operation 610, in which the vehicle is controlled to perform the action according to the second instruction. In this way, the vehicle is controlled to perform actions in an increasingly conservative manner in the presence of multiple faults taking all present faults into account before performing an action.

Figure 7A:
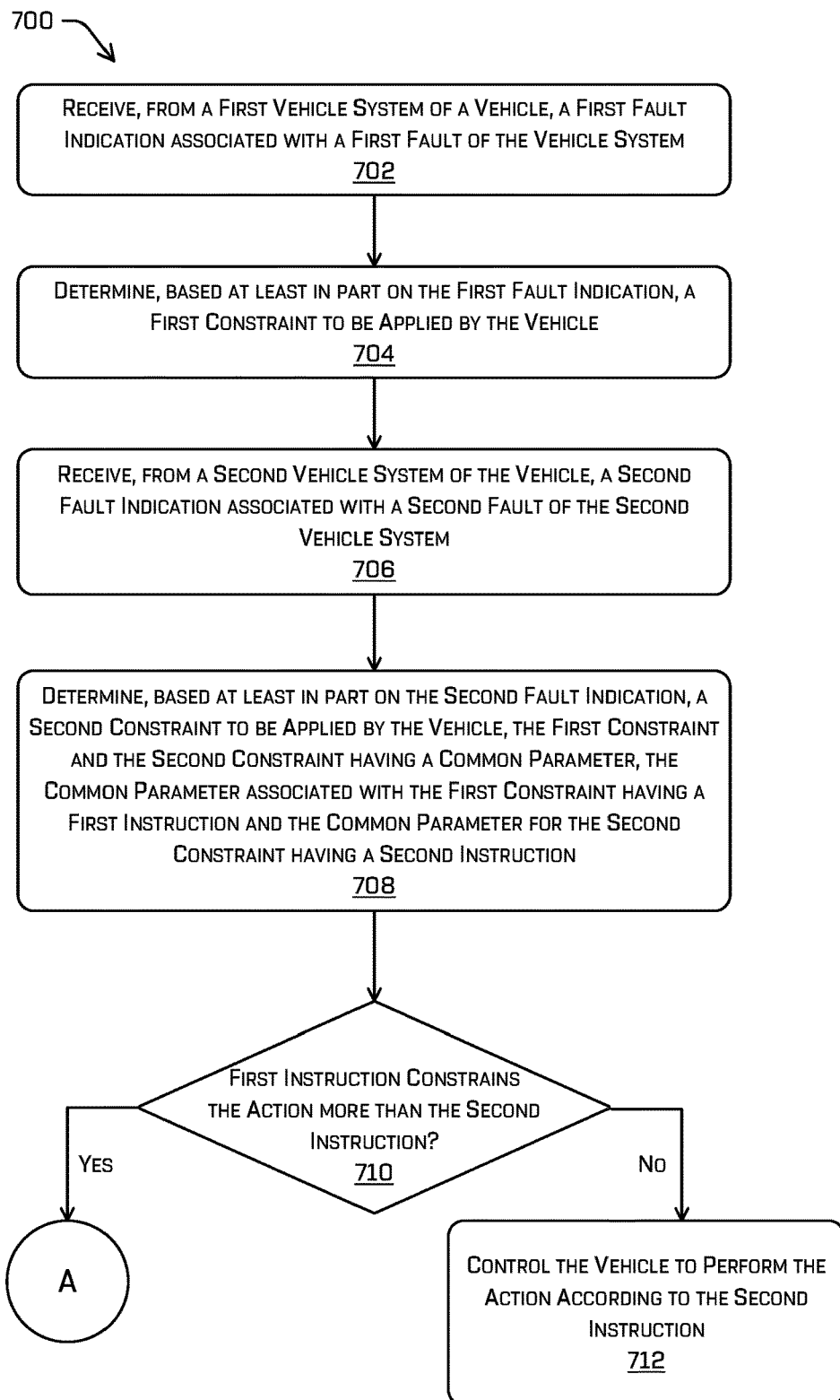
FIGS. 7A and 7B depict an example process for controlling a vehicle to perform an action according to a first constraint or a second constraint based on determining whether a first fault associated with the first constraint is resolved and whether a release instruction has been received, in accordance with examples of the disclosure.
Figure 7B:
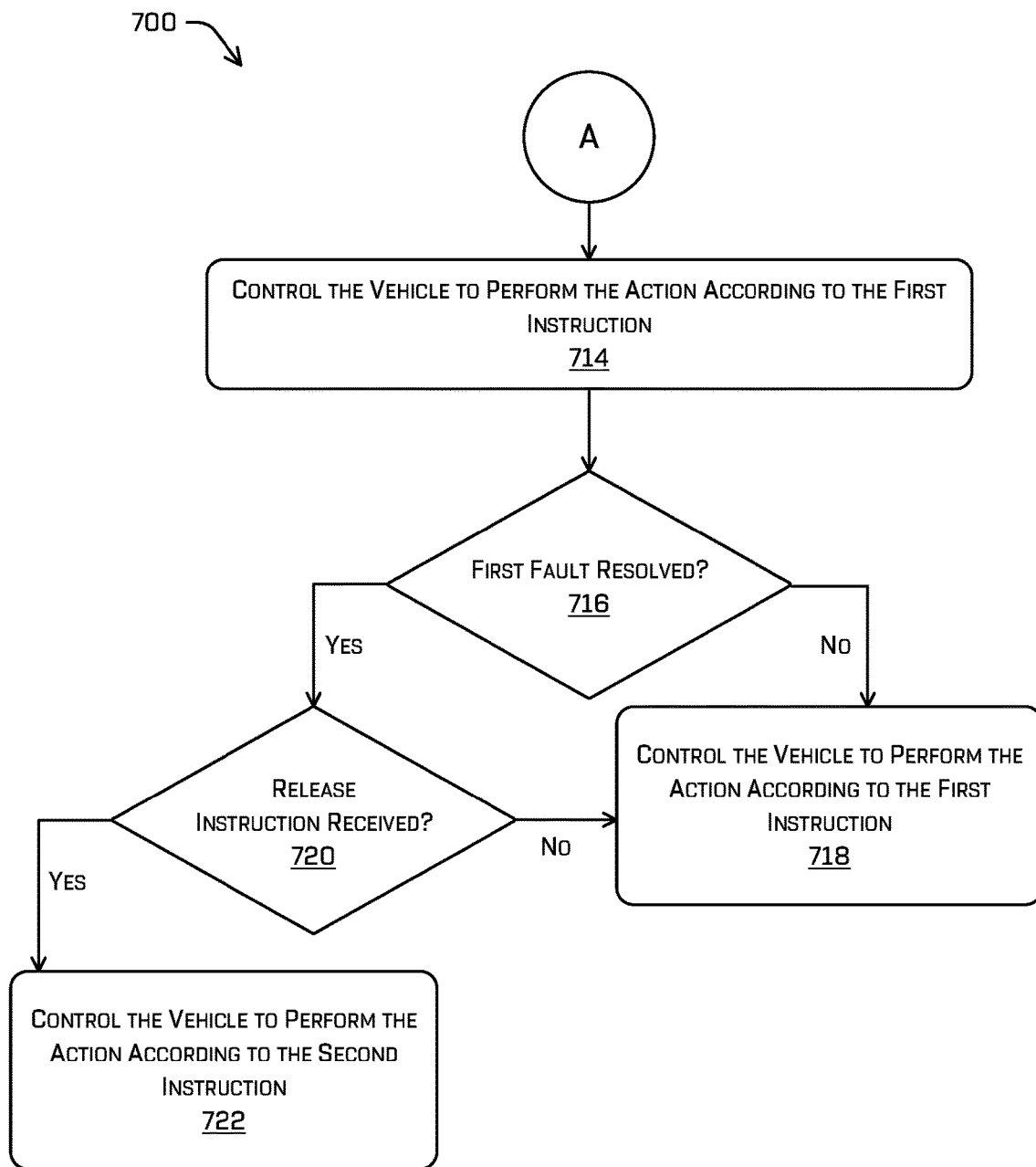

FIGS. 7A and 7B depict an example process 700 for controlling a vehicle to perform an action according to a first constraint or a second constraint based on determining whether a first fault associated with the first constraint is resolved and whether a release instruction has been received, in accordance with examples of the disclosure. For example, some or all of the process 700 can be performed by one or more components in FIGS. 1 and/or 5, as described herein. For example, some or all of the process 700 can be performed by the vehicle computing device(s) 504, the computing device(s) 540, or any other computing device or combination of computing devices. Further, any of the operations described in the example process 700 may be executed in parallel, in a different order than depicted in the process 700, omitted, combined with other processes such as the process 600, and the like.

An operation 702 includes receiving, from a first vehicle system of a vehicle, a first fault indication associated with a first fault of the vehicle system. In some examples, the fault monitor component 126 may receive the fault indication 124 from a vehicle management component 104 in response to a fault experienced by a component of the vehicle 102 monitored by the corresponding vehicle management component 104. The fault indication 124 may include information such as a fault ID 128, a fault reaction 130, and/or a detection threshold 132 that correspond to the fault being experienced by the component.

An operation 704 includes determining, based at least in part on the first fault indication, a first constraint to be applied by the vehicle. In some cases, the constraint may comprise an instruction to constrain an action of a vehicle system from which the fault originated, and/or an instruction to constrain an action of one or more other systems of the vehicle.

An operation 706 includes receiving, from a second vehicle system of the vehicle, a second fault indication associated with a second fault of the second vehicle system. Similar to above, the fault monitor component 126 may receive the fault indication 124 from a vehicle management component 104 in response to a fault experienced by a component of the vehicle 102 monitored by the corresponding vehicle management component 104. The fault indication 124 may include information such as a fault ID 128, a fault reaction 130, and/or a detection threshold 132 that correspond to the fault being experienced by the component.

An operation 708 includes determining, based at least in part on the second fault indication, a second constraint to be applied by the vehicle. The first constraint and the second constraint may have a common parameter. The common parameter associated with the first constraint may have a first instruction, and the common parameter associated with the second constraint may have a second instruction. For example, two constraints output by the constraint mapping component 302 may have a common parameter corresponding to a similar action but having different values (e.g., a first pull-over time of one minute and a second pull-over time of five minutes). In some cases, the common parameter may correspond to different actions that may directly or indirectly conflict with one another, such as a maximum speed constraint and a pull-over constraint indicating that the vehicle is to pull over within a predetermined amount of time.

An operation 710 includes determining whether the first instruction constrains an action more than the second instruction. For example, the fault monitor component 126 may determine which of the instructions causes the vehicle to proceed more conservatively, more safely, and/or in a way that minimizes additional potential faults or damage to the vehicle. If the response at the operation 710 is "No" (e.g., the second instruction constrains the action more than the first instruction), the process may proceed to operation 712, in which the vehicle is controlled to perform the action according to the second instruction. In examples, the operation 710 may further comprise preventing the first instruction from being output to the vehicle systems 104 (e.g., to prevent redundancies).

If the response at the operation 710 is "Yes" (e.g., the first instruction constrains the action more than the second instruction), the process may proceed via "A" to operation 714 shown in FIG. 7B. The operation 714 includes controlling the vehicle to perform the action according to the first instruction. In some cases, even though the vehicle is controlled to perform the action according to the first instruction, the second instruction may be stored and/or output to the corresponding vehicle system as well.

An operation 716 includes determining whether the first fault is resolved. If the response at the operation 716 is "No" (e.g., the first fault indication is still present), the process may proceed to operation 718, in which the vehicle is controlled to perform the action according to the first instruction. For instance, the vehicle may receive continuous feedback (and/or feedback at regular or irregular intervals) relating to the fault associated with the first fault indication. As long as the vehicle continues to experience the fault according to the feedback, the fault monitor component 126 may instruct the corresponding vehicle systems to perform the action according to the first instruction in the first constraint.

If the response at the operation 716 is "Yes" (e.g., the first fault indication is no longer present, and/or the fault monitor component 126 receives a notification that the fault is resolved), the process may proceed to operation 720. The operation 720 includes determining whether a release instruction is received. In some examples, the first vehicle system that output the first fault indication may subsequently output a notification to the fault monitor component 126 (and/or the remote computing device 148) that the fault is resolved. Despite the first fault being resolved, the fault monitor component 126 may prevent the vehicle from returning to an operational state that is not constrained by the first constraint until confirmation is received from the remote computing device 148 and/or a human operator. Accordingly, if the response at the operation 720 is "No" (e.g., a release instruction has not been received), the process may return to the operation 718 in which the vehicle is controlled to perform the action according to the first instruction.

If the response at the operation 720 is "Yes" (e.g., a release instruction has been received), the process may proceed to operation 722, in which the vehicle is controlled to perform the action according to the second instruction. As noted above, the first instruction was determined to constrain the action to be performed by the vehicle more than the second instruction. In some examples, the fault monitor component 126 may output and/or enforce the second instruction in response to the release instruction for the first fault. In this way, the vehicle continues to proceed in a constrained manner to accommodate the second fault until the second fault is resolved and released. If the first and second faults are resolved (e.g., no faults remain that inhibit normal progression of the vehicle through the environment), the vehicle may be permitted to traverse the environment according to a nominal operating parameter based at least in part on the confirmation from the remote computing device 148. Additional details regarding receiving a release from a remote computing device can be found in U.S. patent application Ser. No. 16/539,870, U.S. patent application Ser. No. 16/539,873, and U.S. patent application Ser. No. 16/539,878, which are incorporated by reference herein in their entireties.

In an illustrative example, the first fault indication may indicate an that a component of the vehicle is overheating, and the second fault indication may indicate that a headlight of the vehicle is out. After employing the first constraint (e.g., a pull-over constraint), the fault monitor component 126 may receive a notification from the first vehicle system that the overheating fault is resolved (e.g., the temperature has decreased below a threshold temperature). The fault monitor component 126 may output a notification to the remote computing device 148 that the overheating fault is resolved, and receive a release instruction from the remote computing device 148 to continue operation, thus clearing the first constraint. Even after receiving the release instruction, the fault monitor component 126 may cause the vehicle to traverse the environment according to the second constraint, which may constrain the vehicle uni-directionally to ensure safety and visibility despite the malfunctioning headlight.

EXAMPLE CLAUSES

A: A system comprising: one or more processors; and one or more computer-readable media storing instructions executable by the one or more processors, wherein the instructions, when executed, cause the system to perform operations comprising: receiving, from a first vehicle system of a vehicle, a first fault indication associated with the first vehicle system; determining, based at least in part on the first fault indication, a first constraint to be applied by the vehicle; receiving, from a second vehicle system of the vehicle, a second fault indication associated with the second vehicle system; determining, based at least in part on the second fault indication, a second constraint to be applied by the vehicle; determining, based at least in part on a presence of the first fault indication and the second fault indication, a third constraint to be applied by the vehicle, the third constraint being a different constraint than the first constraint and the second constraint; and controlling the vehicle to perform an action based at least in part on the third constraint.

B: The system of paragraph A, wherein controlling the vehicle to perform the action comprises controlling a third vehicle system, the third vehicle system being a different vehicle system than the first vehicle system and the second vehicle system.

C: The system of paragraph A or B, wherein the third constraint comprises a command to alter performance of the first vehicle system or the second vehicle system.

D: The system of any of claims A-C, the operations further comprising determining a severity level of the first fault indication or the second fault indication, wherein determining the third constraint to be applied by the vehicle is further based on the severity level of the first fault indication or the second fault indication.

E: A method comprising: receiving, from a first vehicle system of a vehicle, a first fault indication associated with the first vehicle system; receiving, from a second vehicle system of the vehicle, a second fault indication associated with the second vehicle system; determining, based at least in part on a presence of the first fault indication and the second fault indication, a constraint to be applied by the vehicle; and controlling the vehicle to perform an action based at least in part on the constraint.

F: The method of paragraph E, wherein the constraint is a first constraint comprising a first instruction, the method further comprising: determining, based at least in part on the first fault indication, a second constraint comprising a second instruction to be applied by the vehicle; determining, based at least in part on the second fault indication, a third constraint to be applied by the vehicle, where the second constraint and the third constraint, when applied by one or more of the first or second vehicle systems, cause the first or second vehicle systems to alter a common state of the vehicle; and determining that the first instruction is more constraining on the action than the second instruction, wherein determining the first constraint is further based on the first instruction.

G: The method of paragraph E or F, wherein the constraint is a first constraint, the method further comprising: determining, based at least in part on the first fault indication, a second constraint to be applied by the vehicle; and determining, based at least in part on the second fault indication, a third constraint to be applied by the vehicle, wherein the first constraint is a different constraint than the second constraint and the third constraint.

H: The method of any of claims E-G, wherein the vehicle system comprises: a drive manager system that controls operations of vehicle components to execute a trajectory; a body manager system that monitors the vehicle components; a manual control system that enables the vehicle to be controlled, in part, by a human driver; a remote control system; a fault monitor system; a planning system; a power manager system; a temperature regulation system; or an electronic control unit.

I: The method of any of claims E-H, wherein the constraint comprises an alternate trajectory other than a nominal trajectory, the alternate trajectory comprising one or more of: a first trajectory that causes the vehicle to stop within a first time period; a second trajectory that causes the vehicle to stop within a second time period, the second time period being shorter than the first time period; or an emergency stop trajectory.

J: The method of any of claims E-I, wherein the constraint comprises an instruction, that when executed by the vehicle, causes the vehicle to one or more of: limit a steering angle of the vehicle; limit a steering rate of the vehicle; limit a direction of travel of the vehicle to a first direction; limit a grade of a surface to be traversed by the vehicle; limit a speed of the vehicle; or limit a turning radius of the vehicle.

K: The method of any of claims E-J, wherein the constraint constrains a mission type of multiple mission types of the vehicle, the mission types comprising: all driving missions; unoccupied driving missions that prevent a passenger from entering the vehicle; stationary service missions that are associated with maintenance of the vehicle; and no missions.

L: The method of any of claims E-K, wherein the constraint comprises an instruction that when executed by the vehicle imposes an environmental condition limit corresponding to: a type of terrain that the vehicle is permitted to traverse; a geographic region that the vehicle is permitted to traverse; a type of weather that the vehicle is permitted to operate in; a type of traffic that the vehicle is permitted to operate in; or a type of road network that the vehicle is permitted to traverse.

M: The method of any of claims E-L, wherein the constraint constrains an amount of power output by the first vehicle system, the second vehicle system, or a third vehicle system.

N: The method of any of claims E-M, wherein the constraint constrains steering of the vehicle, wherein the steering is constrained based at least in part on: a number of wheels that control the steering of the vehicle; a velocity of the vehicle; or a constant restriction on the steering independent of the velocity of the vehicle.

O: One or more computer-readable media storing instructions that, when executed by one or more processors, cause the one or more processors to perform operations comprising: receiving, from a first vehicle system of a vehicle, a first fault indication associated with the first vehicle system; receiving, from a second vehicle system of the vehicle, a second fault indication associated with the second vehicle system; determining, based at least in part on a presence of the first fault indication and the second fault indication, a constraint to be applied by the vehicle; and controlling the vehicle to perform an action based at least in part on the constraint.

P: The one or more computer-readable media of paragraph O, the operations further comprising: receiving a notification that the first fault is resolved; transmitting, based at least in part on the notification, a signal to a remote system; receiving, from the remote system, a confirmation of the first fault being resolved; and controlling the vehicle according to a nominal operating parameter based at least in part on the confirmation.

Q: The one or more computer-readable media of paragraph P, wherein the constraint is a first constraint, the operations further comprising: determining a second constraint to be applied by the vehicle; and controlling the vehicle to perform the action based at least in part on the second constraint and based at least in part on the confirmation that the first fault is resolved.

R: The one or more computer-readable media of any of claims O-Q, wherein controlling the vehicle to perform the action comprises controlling a third vehicle system, the third vehicle system being a different vehicle system than the first vehicle system and the second vehicle system.

S: The one or more computer-readable media of any of claims O-R, wherein the constraint is a first constraint comprising a first instruction, the operations further comprising: determining, based at least in part on the first fault indication, a second constraint comprising a second instruction to be applied by the vehicle; determining, based at least in part on the second fault indication, a third constraint to be applied by the vehicle, where the second constraint and the third constraint, when applied by one or more of the first or second vehicle systems, cause the first or second vehicle systems to alter a common state of the vehicle; and determining that the first instruction is more constraining on the action than the second instruction, wherein determining the first constraint is further based on the first instruction.

T: The one or more computer-readable media of any of claims O-S, wherein the constraint is a first constraint, the operations further comprising: determining, based at least in part on the first fault indication, a second constraint to be applied by the vehicle; and determining, based at least in part on the second fault indication, a third constraint to be applied by the vehicle, wherein the first constraint is a different constraint than the second constraint and the third constraint.

U: A system comprising: one or more processors; and one or more computer-readable media storing instructions executable by the one or more processors, wherein the instructions, when executed, cause the system to perform operations comprising: receiving, from a first vehicle system of a vehicle, a fault indication associated with the first vehicle system; determining, based at least in part on the fault indication, a first constraint to be applied by the first vehicle system and configured to cause the vehicle to perform a first action; outputting, at a first time, the first constraint to the first vehicle system; determining, at a second time after the first time, that the first vehicle system is failing to enforce the constraint; determining, based at least in part on the first vehicle system failing to enforce the constraint and the first action, a second constraint to be applied by a second vehicle system and configured to cause the vehicle to perform a second action; and outputting the second constraint to the second vehicle system to control the vehicle to perform the second action.

V: The system of paragraph U, wherein the first constraint comprises one or more of: a trajectory to be performed by the vehicle, a constraint on a direction of travel of the vehicle, a constraint on a type of mission to be performed by the vehicle, or a maximum voltage to be used by the vehicle.

W: The system of paragraph U or V, wherein the second constraint comprises one or more of: an emergency stop maneuver to be performed, a request to use an alternate system of the vehicle, or a rejection of a trajectory.

X: The system of any of claims U-W, the operations further comprising: receiving sensor data from a sensor associated with the vehicle; and determining, based at least in part on the sensor data, a vehicle state, wherein determining the vehicle is failing to perform the action is based at least in part on one or more of the vehicle state or a signal from the first vehicle system.

Y: The system of paragraph X, wherein the vehicle state comprises one or more of: a trajectory being followed by the vehicle, a direction of travel of the vehicle, a geolocation of the vehicle, or a voltage request from one or more components of the vehicle.

Z: A method comprising: receiving a fault indication associated with a vehicle; determining, based at least in part on the fault indication, a first constraint to be applied by a first vehicle system of the vehicle; outputting, at a first time, the first constraint to the first vehicle system; determining, at a second time after the first time, that the first vehicle system is failing to enforce the constraint; determining, based at least in part on the first vehicle system failing to enforce the constraint, a second constraint to be applied by a second vehicle system; and outputting the second constraint to the second vehicle system.

AA: The method of paragraph Z, wherein the first vehicle system or the second vehicle system comprise: a drive manager system that controls operations of vehicle components to execute a trajectory; a body manager system that monitors the vehicle components; a manual control system that enables the vehicle to be controlled, in part, by a human driver; a remote control system; a fault monitor system; a planning system; a power manager system; a temperature regulation system; or an electronic control unit.

AB: The method of paragraph Z or AA, wherein the first constraint comprises a maximum speed of the vehicle, and the second constraint comprises an instruction that, when executed by the second vehicle system, causes the vehicle to stop.

AC: The method of any of claims Z-AB, wherein the first constraint or the second constraint comprise an instruction, that when executed by the vehicle, causes the vehicle to one or more of: limit a direction of travel of the vehicle to a first direction; limit a grade of a surface to be traversed by the vehicle; limit a speed of the vehicle; or limit a turning radius of the vehicle.

AD: The method of any of claims Z-AC, wherein the first constraint or the second constraint constrain a mission type of multiple mission types of the vehicle, the mission types comprising: all driving missions; unoccupied driving missions that prevent a passenger from entering the vehicle; stationary service missions that are associated with maintenance of the vehicle; and no missions.

AE: The method of any of claims Z-AD, wherein the first constraint or the second constraint comprise an instruction that when executed by the vehicle imposes an environmental condition limit corresponding to: a type of terrain that the vehicle is permitted to traverse; a geographic region that the vehicle is permitted to traverse; a type of weather that the vehicle is permitted to operate in; a type of traffic that the vehicle is permitted to operate in; or a type of road network that the vehicle is permitted to traverse.

AF: The method of any of claims Z-AE, further comprising receiving feedback associated with the first vehicle system at a third time after the first time and before the second time, wherein determining that the first vehicle system is failing to enforce the constraint is based at least in part on the feedback.

AG: The method of any of claims Z-AF, wherein the first constraint or the second constraint constrains steering of the vehicle, wherein the steering is constrained based at least in part on: a number of wheels that control the steering of the vehicle; a velocity of the vehicle; or a constant restriction on the steering independent of the velocity of the vehicle.

AH: The method of any of claims Z-AG, wherein the fault indication is a first fault indication, the method further comprising: transmitting a first signal indicative of the first fault indication to a computing device; receiving a notification that a fault associated with the first fault indication is resolved; transmitting a second signal indicative of the notification that the fault is resolved to the computing device; receiving, from the computing device, confirmation of a resolution of the fault; and controlling the vehicle according to a nominal operating parameter based at least in part on the confirmation.

AI: One or more computer-readable media storing instructions that, when executed by one or more processors, cause the one or more processors to perform operations comprising: receiving a fault indication associated with a vehicle; determining, based at least in part on the fault indication, a first constraint to be applied by a first vehicle system of the vehicle; outputting, at a first time, the first constraint to the first vehicle system; determining, at a second time after the first time, that the first vehicle system is failing to enforce the constraint; determining, based at least in part on the first vehicle system failing to enforce the constraint, a second constraint to be applied by a second vehicle system; and outputting the second constraint to the second vehicle system to control the vehicle to perform an action.

AJ: The one or more computer-readable media of paragraph AI, wherein the first constraint comprises one or more of: a trajectory to be performed by the vehicle, a constraint on a direction of travel of the vehicle, a constraint on a type of mission to be performed by the vehicle, or a maximum voltage to be used by the vehicle.

AK: The one or more computer-readable media of paragraph AI or AJ, wherein the second constraint comprises one or more of: an emergency stop maneuver to be performed, a request to use an alternate system of the vehicle, or a rejection of a trajectory.

AL: The one or more computer-readable media of any of claims AI-AK, wherein the fault indication is a first fault indication, the operations further comprising generating a second fault indication based at least in part on the first vehicle system failing to enforce the constraint.

AM: The one or more computer-readable media of paragraph AL, the operations further comprising: receiving a notification that the fault is resolved; transmitting, based at least in part on the notification, a signal to a remote system; receiving, from the remote system, a confirmation of the fault being resolved; and controlling the vehicle according to a nominal operating parameter based at least in part on the confirmation.

AN: The one or more computer-readable media of any of claims AI-AM, the operations further comprising receiving a signal from the first vehicle system at a time after the first time, wherein determining that the first vehicle system is failing to enforce the constraint is based at least in part on the signal.

While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
      receiving, from a first vehicle system of a vehicle, a fault indication associated with the first vehicle system;
      determining, based at least in part on the fault indication, a first constraint to be applied by the first vehicle system and configured to cause the vehicle to perform a first action, wherein the first constraint comprises one or more of:
         a trajectory to be performed by the vehicle,
         a constraint on a direction of travel of the vehicle,
         a constraint on a type of mission to be performed by the vehicle, or
         a maximum voltage to be used by the vehicle;
      outputting, at a first time, the first constraint to the first vehicle system;
      determining, at a second time after the first time, that the first vehicle system is failing to enforce the first constraint;
      determining, based at least in part on the first vehicle system failing to enforce the first constraint and the first action, a second constraint to be applied by a second vehicle system and configured to cause the vehicle to perform a second action, wherein the second constraint comprises one or more of:
         an emergency stop maneuver to be performed,
         a request to use an alternate system of the vehicle, or
         a rejection of a trajectory; and
      outputting the second constraint to the second vehicle system to control the vehicle to perform the second action.

2. The system of claim 1, the operations further comprising:
   receiving sensor data from a sensor associated with the vehicle; and
   determining, based at least in part on the sensor data, a vehicle state,
   wherein determining the vehicle is failing to perform the first action is based at least in part on one or more of the vehicle state or a signal from the first vehicle system.

3. The system of claim 2, wherein the vehicle state comprises one or more of:
   a trajectory being followed by the vehicle,
   a direction of travel of the vehicle,
   a geolocation of the vehicle, or
   a voltage request from one or more components of the vehicle.

4. A method comprising:
   receiving a fault indication associated with a vehicle;
   determining, based at least in part on the fault indication, a first constraint to be applied by a first vehicle system of the vehicle;
   outputting, at a first time, the first constraint to the first vehicle system;
   receiving feedback associated with the first vehicle system at a second time after the first time;
   determining, at a third time after the second time and based at least in part on the feedback, that the first vehicle system is failing to enforce the first constraint;
   determining, based at least in part on the first vehicle system failing to enforce the constraint, a second constraint to be applied by a second vehicle system; and
   outputting the second constraint to the second vehicle system.

5. The method of claim 4, wherein the first vehicle system or the second vehicle system comprise at least one of:
   a drive manager system that controls operations of vehicle components to execute a trajectory;
   a body manager system that monitors the vehicle components;
   a manual control system that enables the vehicle to be controlled, in part, by a human driver;
   a remote control system;
   a fault monitor system;

a planning system;
a power manager system;
a temperature regulation system; or
an electronic control unit.

6. The method of claim 4, wherein the first constraint comprises a maximum speed of the vehicle, and the second constraint comprises an instruction that, when executed by the second vehicle system, causes the vehicle to stop.

7. The method of claim 4, wherein the first constraint or the second constraint comprise an instruction, that when executed by the vehicle, causes the vehicle to one or more of:
limit a direction of travel of the vehicle to a first direction;
limit a grade of a surface to be traversed by the vehicle;
limit a speed of the vehicle; or
limit a turning radius of the vehicle.

8. The method of claim 4, wherein the first constraint or the second constraint constrain a mission type of multiple mission types of the vehicle, the mission types comprising:
all driving missions;
unoccupied driving missions that prevent a passenger from entering the vehicle;
stationary service missions that are associated with maintenance of the vehicle; and
no missions.

9. The method of claim 4, wherein the first constraint or the second constraint comprise an instruction that when executed by the vehicle imposes an environmental condition limit corresponding to at least one of:
a type of terrain that the vehicle is permitted to traverse;
a geographic region that the vehicle is permitted to traverse;
a type of weather that the vehicle is permitted to operate in;
a type of traffic that the vehicle is permitted to operate in; or
a type of road network that the vehicle is permitted to traverse.

10. The method of claim 4, wherein the first constraint or the second constraint constrains steering of the vehicle, wherein the steering is constrained based at least in part on at least one of:
a number of wheels that control the steering of the vehicle;
a velocity of the vehicle; or
a constant restriction on the steering independent of the velocity of the vehicle.

11. The method of claim 4, wherein the fault indication is a first fault indication, the method further comprising:
transmitting, to a computing device, a first signal indicative of the first fault indication;
receiving a notification that a fault associated with the first fault indication is resolved;
transmitting, to the computing device, a second signal indicative of the notification that the fault is resolved;
receiving, from the computing device, confirmation of a resolution of the fault; and
controlling the vehicle according to a nominal operating parameter based at least in part on the confirmation.

12. The method of claim 4, wherein the first vehicle system is different than the second vehicle system.

13. One or more non-transitory computer-readable media storing instructions that, when executed by one or more processors, cause the one or more processors to perform operations comprising:
receiving a fault indication associated with a vehicle;
determining, based at least in part on the fault indication, a first constraint to be applied by a first vehicle system of the vehicle, wherein the first constraint comprises one or more of:
a trajectory to be performed by the vehicle,
a constraint on a direction of travel of the vehicle,
a constraint on a type of mission to be performed by the vehicle, or
a maximum voltage to be used by the vehicle;
outputting, at a first time, the first constraint to the first vehicle system;
determining, at a second time after the first time, that the first vehicle system is failing to enforce the first constraint;
determining, based at least in part on the first vehicle system failing to enforce the first constraint, a second constraint to be applied by a second vehicle system, wherein the second constraint comprises one or more of:
an emergency stop maneuver to be performed,
a request to use an alternate system of the vehicle, or
a rejection of a trajectory; and
outputting the second constraint to the second vehicle system to control the vehicle to perform an action.

14. The one or more non-transitory computer-readable media of claim 13, wherein the fault indication is a first fault indication, the operations further comprising generating a second fault indication based at least in part on the first vehicle system failing to enforce the second constraint.

15. The one or more non-transitory computer-readable media of claim 14, the operations further comprising:
receiving a notification that a fault associated with the second fault indication is resolved;
transmitting, based at least in part on the notification, a signal to a remote system;
receiving, from the remote system, a confirmation of the fault being resolved; and
controlling the vehicle according to a nominal operating parameter based at least in part on the confirmation.

16. The one or more non-transitory computer-readable media of claim 13, the operations further comprising receiving a signal from the first vehicle system at a time after the first time, wherein determining that the first vehicle system is failing to enforce the first constraint is based at least in part on the signal.

* * * * *